(12) United States Patent
Turner et al.

(10) Patent No.: US 7,635,243 B2
(45) Date of Patent: Dec. 22, 2009

(54) LOAD INDICATING FASTENER AND METHOD OF MANUFACTURE

(75) Inventors: Jonathan M. Turner, Philadelphia, PA (US); Nicholas Strumbos, Birmingham, MI (US); Robert Stewart, Farmington Hills, MI (US)

(73) Assignee: TurnAnut, LLC, Livonia, MI (US)

( * ) Notice: Subject to any disclaimer, the term of this patent is extended or adjusted under 35 U.S.C. 154(b) by 308 days.

(21) Appl. No.: 11/501,993

(22) Filed: Aug. 10, 2006

(65) Prior Publication Data

US 2008/0038076 A1  Feb. 14, 2008

(51) Int. Cl.
*F16B 31/02* (2006.01)
*F16B 43/00* (2006.01)
*F16B 29/34* (2006.01)

(52) U.S. Cl. .............. 411/10; 411/8; 411/9; 411/533; 411/156; 411/536

(58) Field of Classification Search ............ 411/8, 411/9, 10, 11, 533, 156, 535, 536
See application file for complete search history.

(56) References Cited

U.S. PATENT DOCUMENTS

| | | | | |
|---|---|---|---|---|
| 2,520,259 | A | * | 8/1950 | Pummill .................. 411/265 |
| 3,187,621 | A | | 6/1965 | Turner |
| 4,431,353 | A | * | 2/1984 | Capuano ................. 411/11 |
| 4,900,209 | A | * | 2/1990 | Reynolds ................ 411/432 |
| 5,015,132 | A | * | 5/1991 | Turner et al. ............ 411/10 |
| 5,256,020 | A | * | 10/1993 | Ikeda et al. ............. 411/368 |
| 5,370,483 | A | * | 12/1994 | Hood et al. ............. 411/10 |
| 5,487,632 | A | | 1/1996 | Hood et al. |
| 5,597,279 | A | * | 1/1997 | Thomas et al. .......... 411/432 |
| 5,667,346 | A | * | 9/1997 | Sharp ..................... 411/10 |
| 5,769,581 | A | * | 6/1998 | Wallace et al. .......... 411/10 |
| 5,827,025 | A | * | 10/1998 | Henriksen .............. 411/11 |
| 5,908,278 | A | * | 6/1999 | Hasan et al. ............ 411/533 |
| 5,931,618 | A | * | 8/1999 | Wallace et al. .......... 411/10 |
| 5,975,821 | A | * | 11/1999 | Kue ....................... 411/533 |

OTHER PUBLICATIONS

REMIC Brochure, TAPTITE II and Other TRILOBULAR Products for Fastening Metals and Plastics, Copyright 2001, Research Engineering & Manufacturing Inc.

* cited by examiner

*Primary Examiner*—Victor Batson
*Assistant Examiner*—David C Reese
(74) *Attorney, Agent, or Firm*—Stradley Ronon Stevens & Young (57) ABSTRACT

A load indicating fastener comprising a load indicator and a fastener body. The load indicator comprises an annular body defining a through hole having a minimum diameter and a plurality of protuberances integral with a first face of the annular body and a corresponding plurality of indentations in a second face of the annular body opposite from the first face. The fastener body comprises a series of threads, a head defining a contact surface, and a shank depending from the contact surface. The shank includes a first portion having a first outside diameter less than the through hole minimum diameter such that the load indicator is received on the shank first portion and a second portion including at least one radially extending member having a second outside diameter greater than the through hole minimum diameter such that the load indicator is retained on the fastener body thereby.

23 Claims, 6 Drawing Sheets

LOAD INDICATING FASTENER AND METHOD OF MANUFACTURE

The present invention relates, in general, to fasteners and, in particular, to load indicators which enable the desired tension of a fastener to be achieved during installation of the fastener in a joint.

BACKGROUND OF THE INVENTION

It is well known to those skilled in the art that the most accurate way to install tension into fasteners in a joint is to control tightening by developing an indication of the tension in the fastener either directly from the fastener or another component used with the fastener. Fastener installation based on torque control can result in wide variations in the tension in the fastener because of variations in fastener lubricity, burrs on the thread of threaded fasteners, and variations in the friction at the surface of the joint component against which the bearing surface of a threaded fastener bears.

U.S. Pat. No. 3,187,621, which is incorporated herein by reference, is directed to a load indicator adapted for use with a threaded fastener and intended to develop an indication of proper tensioning of the fastener. This load indicator has a plurality of protuberances which are struck and partially sheared from an annular body to leave indentations in the annular body. With this load indicator in a joint, the protuberances are pushed back into the indentations in the annular body as the joint is tightened and tightening is stopped when the protuberances have been "collapsed" back into the indentations in the annular body a prescribed amount. This condition, typically, is sensed by a "feeler" gage inserted into a gap in the joint. U.S. Pat. Nos. 5,015,132, 5,370,483, 5,487,632, 5,667,346, each of which is incorporated herein by reference, also are directed to this type of load indicator.

SUMMARY OF THE INVENTION

In one aspect, the present invention relates to a load indicating fastener comprising a load indicator and a fastener body. The load indicator comprises an annular body defining a through hole having a minimum diameter. The load indicator further comprises a plurality of protuberances integral with the annular body struck and partially sheared from the annular body to project from a first face of the annular body and leave a corresponding plurality of indentations in a second face of the annular body opposite from the first face. The fastener body comprises a series of threads, a head defining a contact surface, and a shank depending from the contact surface. The shank includes a first portion having a first outside diameter less than the through hole minimum diameter such that the load indicator is received on the shank first portion with the protuberances proximate to and in alignment with the head contact surface. The shank further includes a second portion including at least one radially extending member having a second outside diameter greater than the through hole minimum diameter such that the load indicator is retained on the fastener body thereby.

In at least one aspect of the invention, the load indicating fastener is a nut wherein the fastener body defines a through bore extending through the head and the shank and the series of threads are provided along an inside surface of the through bore.

In another aspect of the invention, the load indicating fastener is a bolt or screw wherein the series of threads are provided along an outside surface of the shank second portion. In such an aspect of the invention, one of the threads may define the at least one radially extending member.

In yet another aspect, the invention relates to a load indicator comprising an annular body defining a through hole having a minimum diameter. A plurality of protuberances are formed integral with the annular body, struck and partially sheared from the annular body to project from a first face of the annular body and leave a corresponding plurality of indentations in a second face of the annular body opposite from the first face. An annular groove having a diameter greater than the second outside diameter is defined in the annular body second face about the through hole.

In another aspect, the invention relates to a joint assembly comprising at least one joint member, a load indicating fastener and a secondary fastener. The load indicating fastener includes a load indicator and a fastener body. The load indicator comprises an annular body defining a through hole having a minimum diameter. The load indicator further comprises a plurality of protuberances integral with the annular body struck and partially sheared from the annular body to project from a first face of the annular body and leave a corresponding plurality of indentations in a second face of the annular body opposite from the first face. The fastener body comprises a first series of threads, a first head defining a contact surface, and a first shank depending from the contact surface. The first shank includes a first portion having a first outside diameter less than the through hole minimum diameter such that the load indicator is received on the shank first portion with the protuberances proximate to and in alignment with the head contact surface. The first shank further includes a second portion including at least one radially extending member having a second outside diameter greater than the through hole minimum diameter such that the load indicator is retained on the fastener body thereby. The secondary fastener comprises a second fastener body and a second series of threads. The first shank or a portion of the second fastener body is extended through the at least one joint member and the first series of threads is threadably engaged with the second series of threads until the first head contact surface is spaced a given distance from the annular body first face.

In yet another aspect, the present invention relates to a load indicating fastener comprising a fastener body and a load indicator having an annular body positioned about and captured by a portion of the fastener body. The load indicator has a plurality of protuberances integral with said annular body struck and partially sheared from said annular body to project from a first face of said annular body and leave a corresponding plurality of indentations in a second face of said annular body opposite from said first face.

In another aspect, the present invention relates to a load indicating fastener comprising a load indicator and a fastener body. The load indicator comprises an annular body defining a through hole having a minimum diameter. The load indicator further comprises a plurality of protuberances integral with the annular body struck and partially sheared from the annular body to project from a first face of the annular body and leave a corresponding plurality of indentations in a second face of the annular body opposite from the first face. An annular groove having a diameter greater than said second outside diameter is defined in said second face about said through hole to define a retainment shoulder within said annular body. The fastener body comprises a series of threads, a head defining a contact surface, and a shank depending from the contact surface. The shank includes a first portion having a first outside diameter less than the through hole minimum diameter such that the load indicator is received on the shank first portion with the protuberances proximate to and in alignment with the head contact surface. The shank further includes a second portion including at least one radially extending member having a second outside diameter greater than the through hole minimum diameter such that said at least one radially extending member is received in said annular groove and engages said retainment shoulder to capture said load indicator on said fastener body.

In still yet another aspect, the present invention relates to a method of producing a load indicating fastener comprising: providing a fastener body comprising a first series of threads, a head defining a contact surface, and a shank depending from the contact surface; positioning a load indicator, having an annular body defining a through hole having a minimum diameter and a plurality of protuberances integral with the annular body struck and partially sheared from the annular body to project from a first face of the annular body and leave a corresponding plurality of indentations in a second face of the annular body opposite from the first face, about the shank such that the protuberances are proximate to and in alignment with the head contact surface; and defining at least one radially extending member having an outside diameter greater than the through hole minimum diameter about the shank such that the load indicator is retained on the fastener body thereby.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Referring to FIGS. 1-5, load indicating fastener 10, which is an exemplary embodiment of the present invention, will be described. Load indicating fastener 10 may alternatively be referred to as an engineered clamp load assurance assembly. Load indicating fastener 10 generally comprises fastener body 20 and load indicator 40. In this exemplary embodiment, fastener body 20 is a threaded nut which generally includes head 22 having contact surface 24 with shank 30 depending therefrom. Through bore 26 extends through head 22 and shank 30 and includes a series of internal threads 28. Threads 28 may extend within both head 22 and shank 30, as illustrated, only within head 22, or in any other desired configuration. The illustrated head 22 has a hexagon configuration with six engagement faces 23 (only three are shown), however, other configurations may be utilized. For example, but not limited to, head 22 may be square, straight hex, spanner or hex flange (see FIG. 6). Fastener body 20 may be made to correspond with any desired standard, for example, metric, SAE, ASTM, or British standard. Furthermore, head 22 and threads 28 may include locking features or friction modifiers. For example, head 22 may include a reduced diameter, split portion (not shown) or threads 28 may include a nylon insert (not shown) or the like to provide a locking feature. A friction modifying insert or coating (not shown) or the like may be provided along threads 28 to provide friction modification of fastener 10. Various other modifications may be made to fastener body 20 without departing from the scope of the invention.

Figure 1:
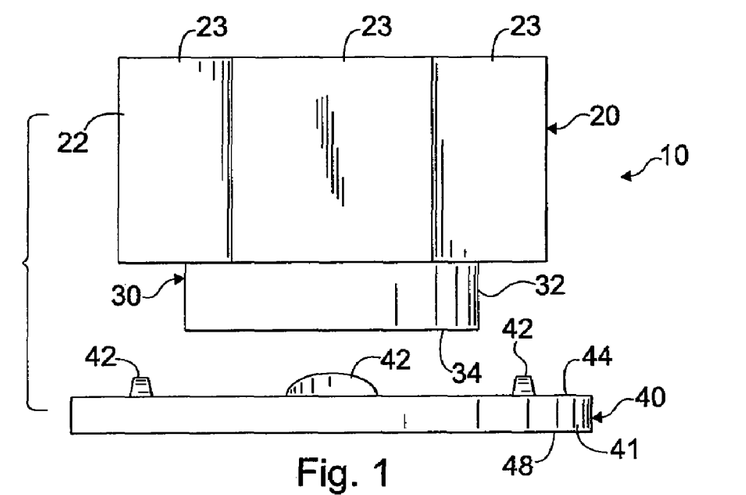
FIG. 1 is a side elevation view of a load indicating fastener in accordance with a first embodiment of the invention prior to assembly of the load indicator with the fastener body.
Figure 2:
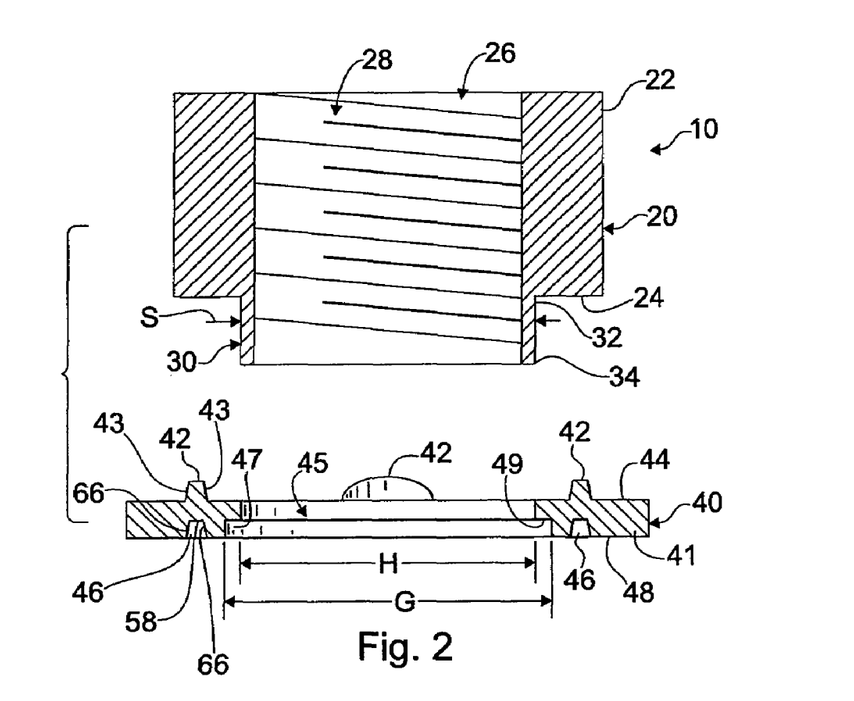
FIG. 2 is a cross-sectional view of the load indicating fastener of FIG. 1 prior to assembly.
Figure 3:
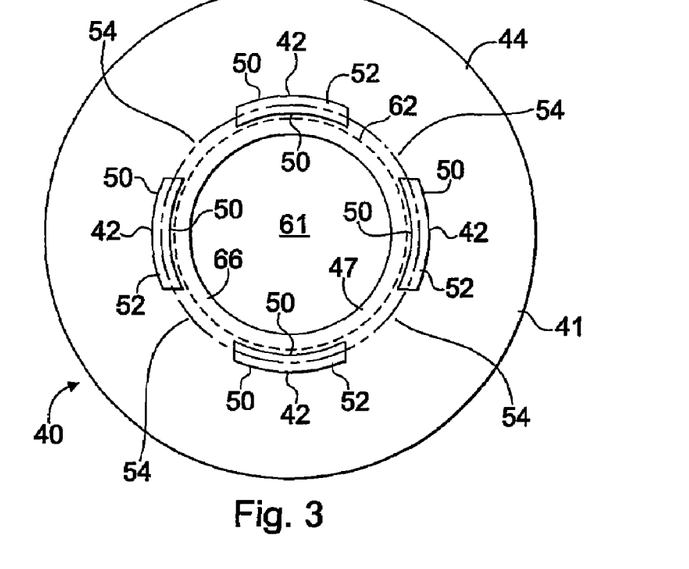
FIG. 3 is a plan view of one face of an illustrative load indicator constructed in accordance with at least one embodiment of the present invention.

Referring to FIG. 3, load indicator 40 in accordance with the present embodiment of the invention includes annular body 41 and a plurality of protuberances 42 integral with annular body 41 struck and partially sheared from annular body 41 to project from first face 44 of annular body 41 and leave a corresponding plurality of indentations 46, see FIG. 2, in second face 48 of annular body 41 opposite from first face 44. Each protuberance 42 is defined by a pair of outer side walls 50 extending away from face 44 of annular body 41 and outer surface 52 extending between the pair of outer side walls 50 and between two spaced regions 54 of face 44 of annular body 41. Each indentation 46 is defined by a pair of inner side walls 66 extending through annular body 41 from second face 48 and from which a pair of outer side walls 43 of one of the protuberances has been sheared and inner surface 58 extending between the pair of inner side walls 66 and between two spaced regions of face 48 of annular body 41.

Each protuberance 42 and each indentation 46 in the present embodiment is curved in outline. The radially outermost points of protuberances 42 and the radially outermost points of indentations 46 lie on a circle having a center at center 61 of annular body 41. Protuberances 42 and indentations 46 are spaced apart by equal arc lengths. For the exemplary embodiment of the invention illustrated in FIG. 3, there are four protuberance/indentation pairs spaced apart by ninety degrees. The number of protuberances 42 and corresponding indentations 46 is not limited to four, but may be more or less. For example, the exemplary embodiment illustrated in FIG. 6 includes five protuberances 42 and corresponding indentations (not shown).

Preferably, protuberances 42 and indentations 46 extend along a circle, shown by dot-dash line 62, having a center at center 61 of annular body 41. The centers of curvature of the protuberance/indentation pairs need not be at center 61 of annular body 41. Instead, each protuberance/indentation pair can have a distinct center of curvature with a radius of curvature which is greater or less than the radius of circle 62. It is preferred that no portions of protuberances 42 extend radially outward beyond an outer periphery defined by head contact surface 24 when load indicator 40 is positioned adjacent fastener body 20.

Figure 4:
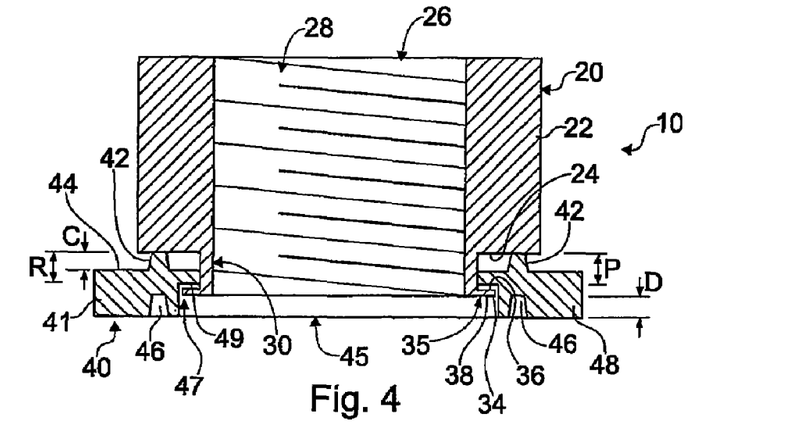
FIG. 4 is a cross-sectional view of the load indicating fastener of FIG. 1 after assembly.

Referring to FIG. 2, load indicator 40 has a through hole 45 with protuberances 42 and indentations 46 extending generally concentric thereabout. Through hole 45 has an inside minimum diameter H that is slightly larger than diameter S of outside surface 32 of shank 30. As such, load indicator 40 is positionable about shank outer surface 32, as illustrated in FIG. 4. In this exemplary embodiment, second face 48 of annular body 41 also includes annular groove 47 about through hole 45. Annular groove 47 has an inside diameter G greater than through hole minimum diameter H. In this exemplary embodiment, annular groove 47 extends about half the thickness of annular body 41 such that retainment shoulder 49 is defined within annular body 41 about through hole 45.

Referring to FIG. 4, after load indicator 40 has been positioned about shank 30, free end 34 of shank 30 is deformed radially outward to define radially extending member 35 having pilot surface 36. Radially extending member 35 is received in annular groove 47 and pilot surface 36 engages retainment shoulder 49 to retain load indicator 40 on fastener body 20 such that load indicator 40 and fastener body 20 form an integral unit. Deformation of shaft free end 34 is controlled such that distance P between pilot surface 36 and head contact surface 24 is greater than distance R between retainment shoulder 49 and the crest of protuberances 42. Such relationship provides an assembled clearance between load indicator 40 and fastener body 20 such that load indicator 40 is rotatable relative to fastener body 20 while remaining captured on fastener body 20. Additionally, in this exemplary embodiment, annular groove 47 and radially extending member 35 are configured such that distance D between bottom surface 38 of radially extending member 35 and second face 48 of annular body 41, when protuberances 42 are in non-compressive contact with head contact surface 24, is greater than height C of protuberances 42. Such a relationship prevents bottom surface 38 from bottoming out upon collapse of protuberances 42. In an alternative exemplary embodiment shank 30 is configured, for example, as a relatively thin-walled structure, such that even if bottom surface 38 bottoms out, shank free end 34 further deforms within the annular groove 47. Shank free end 34 may be deformed in various manners, for example, shank free end 34 may be deformed radially outward by stamping with one or more dies or using an orbital forming method whereby a specially shaped tool is rotated against shank free end 34 as pressure is applied. Other manufacturing methods may also be utilized.

Figure 5:
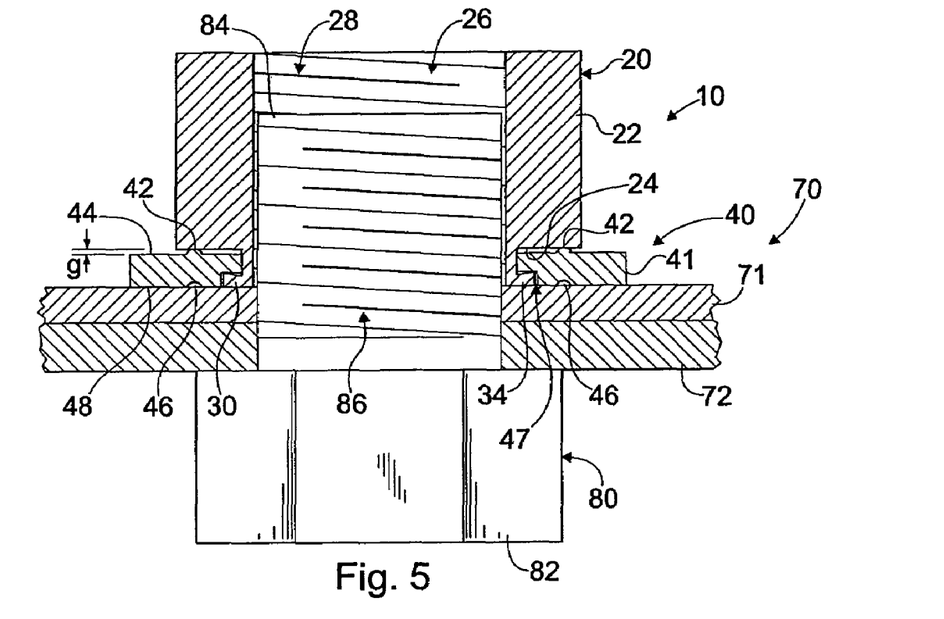
FIG. 5 is a cross-sectional view of a joint assembly in which the load indicating fastener of FIG. 1 has been tightened.

The use of load indicating fastener 10 of FIGS. 1-4 is shown in FIG. 5. An exemplary joint assembly 70, comprising a pair of joint members 71 and 72, load indicating fastener 10, and secondary fastener 80, is assembled with the proper tension by use of load indicating fastener 10. In the present embodiment, secondary fastener 80 is a bolt having head 82 and shank 84 with a series of threads 86. Threaded shank 84 is extended through joint members 71 and 72. Threads 86 are engaged with threads 28 within through bore 26 of fastener body 20. Since load indicator 40 is integral with fastener body 20, it can not be inadvertently omitted.

As secondary fastener 80 and fastener body 20 are threadably engaged with one another, protuberances 42 contact fastener body contact surface 24 and surface 24 begins bearing against the tops of protuberances 42. Since radially extending member 35 is within annular groove 47 in the initially assembled configuration (see FIG. 4), shank 30 does not interfere with load indicator face 48 engaging joint member 71 during tightening. Load indicator 40 is subjected to the clamping load between secondary fastener 80 and fastener body 20 as the joint is assembled and tightened either by driving secondary fastener 80 or fastener body head 22. As the tightening proceeds, protuberances 42 of load indicator 40 collapse back into their associated indentations 46 and the gap "g" between top surface 44 of load indicator 40 and contact surface 24 of fastener body 20 is reduced. When this gap has been reduced a prescribed amount, as measured by a "feeler" gage, the tightening is stopped because the gap represents proper tensioning. The intended gap can have any desired height, including a zero height. In such case, a zero clearance between top surface 44 of load indicator 40 and contact surface 24 (i.e., the two surfaces are in contact with one another) will indicate proper tensioning and a "feeler" gage may not be required.

The intended gap represents proper tensioning because load indicator 40 and fastener body 20 are matched to one another such that protuberances 42 will plastically deform into annular body 41 when the compressive force applied to load indicator 40 has reached the desired tension. The selected load indicator 40 will have characteristics, for example, the number, size and configuration of protuberances 42, the material and hardness of annular body 41 and the like, which, when tensioned by a fastener body 20 having selected characteristics, for example, size, material, contact surface hardness, thread pitch, thread type, and the like, will plastically deform and achieve the desired gap at an intended tension.

Since a matched load indicator 40 is captured on fastener body 20, the risk of an end user mismatching a load indicator with a fastener body, which may result in a false indication of tension, is eliminated. Furthermore, since load indicator 40 is captured on fastener body 20, the risk of an end user improperly orienting load indicator 40 with respect to fastener body 20, for example, with protuberances 42 facing away from contact surface 24, is eliminated. As such, the compressive interface between protuberances 42 and contact surface 24 is assured and the gap "g" is consistently defined between top surface 44 of load indicator 40 and contact surface 24. Such results in greater consistency of assembly, i.e. load indicators 40 are not inadvertently omitted, misoriented, or duplicated, and consistency of load indication.

Figure 6:
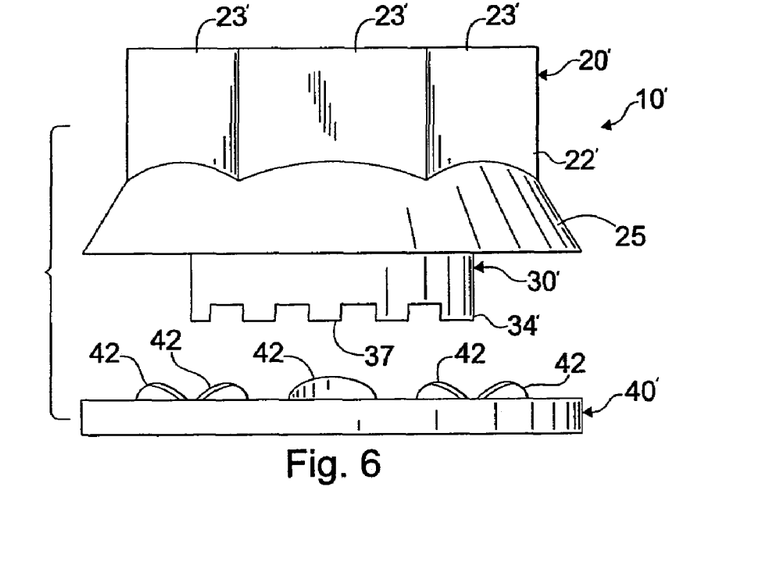
FIG. 6 is a side elevation view of a load indicating fastener in accordance with an alternative embodiment of the invention prior to assembly of the load indicator with the fastener body.
Figure 7:
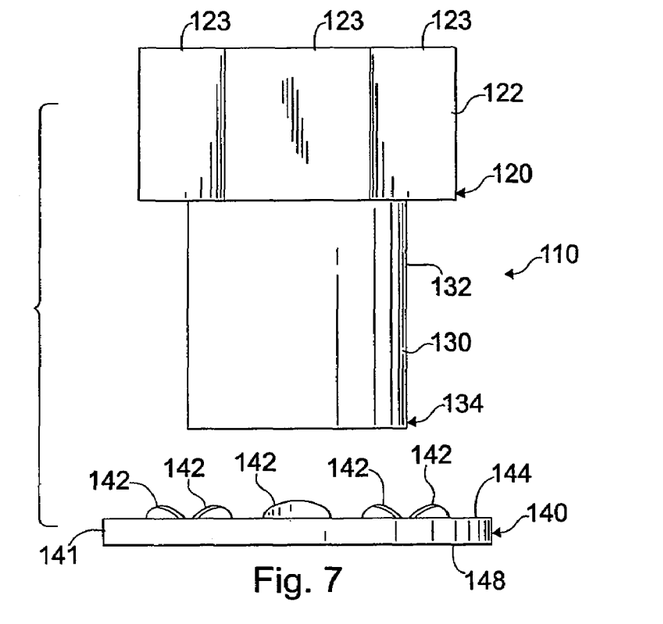
FIG. 7 is a side elevation view of a load indicating fastener in accordance with an another alternative embodiment of the invention prior to assembly of the load indicator with the fastener body.

Referring to FIG. 6, load indicating fastener 10' that is an alternative exemplary embodiment of the present invention is shown. Load indicating fastener 10' is substantially the same as load indicating fastener 10. Other than described herein, fasteners 10 and 10' are the same. Load indicating fastener 10' includes fastener body 20' and load indicator 40'. Fastener body 20' includes head 22' and shank 30'. In this exemplary embodiment, head 22' has a hex flange configuration with outwardly tapered flange 25 depending from engagement faces 23'. Free end 34' of shank 30' defines a plurality of spaced tabs 37 which, as in the previous embodiment, are deformed outwardly to define radially extending members which engage load indicator retainment shoulder 49 and capture load indicator 40' relative to fastener body 20'. Tabs 37 minimize the amount of material required for manufacture is and also reduce the amount of material received in annular groove 47. As few as two spaced apart tabs 37 may be utilized. Load indicator 40' is substantially the same as in the previous embodiment except that it includes five protuberances 42 and corresponding indentations (not shown). Load indicating fastener 10' is assembled and utilized in the same manner as load indicating fastener 10 of the previous embodiment.

Figure 8:
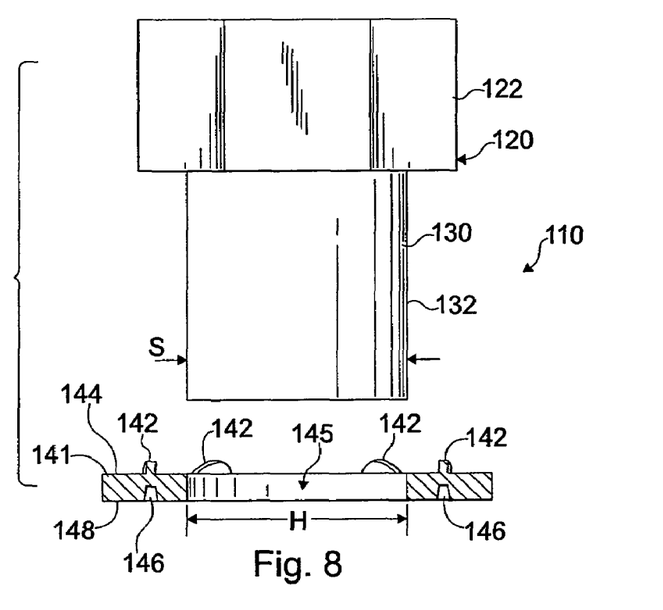
FIG. 8 is a view similar to FIG. 7 showing the load indicator in cross-section.
Figure 9:
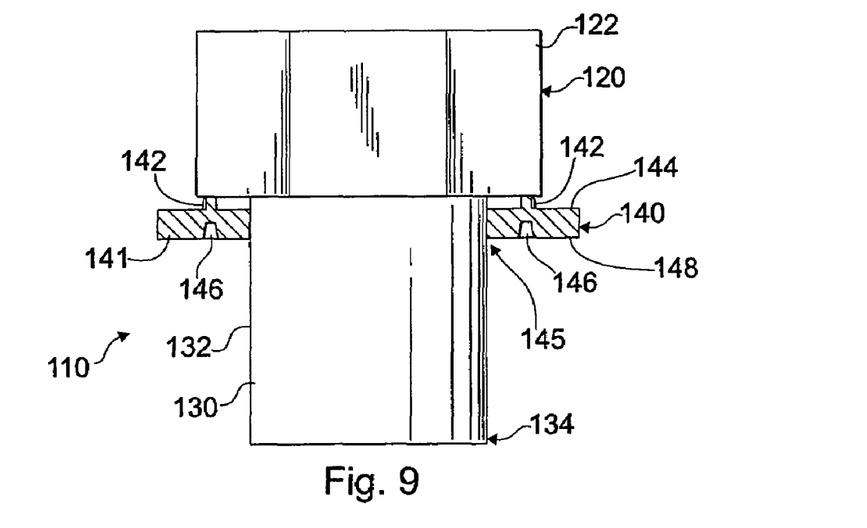
FIG. 9 is a view similar to FIG. 8 showing the load indicator positioned on the fastener body.
Figure 10:
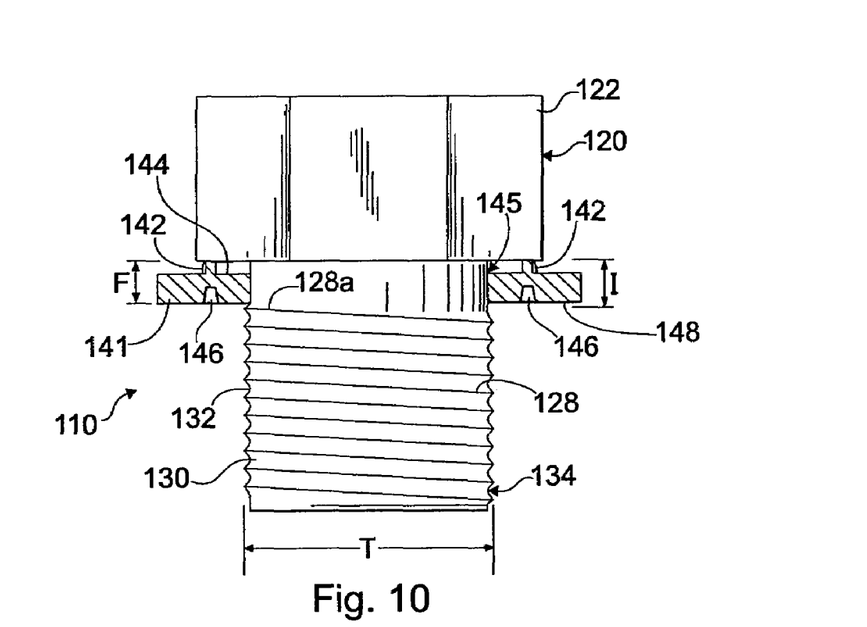
FIG. 10 is a view similar to FIG. 9 after final assembly of the load indicating fastener.

Referring to FIGS. 7-11, load indicating fastener 110 which is another exemplary embodiment of the present invention will be described. Load indicating fastener 110 generally comprises fastener body 120 and load indicator 140. In this exemplary embodiment, fastener body 120 is a bolt or screw which generally includes head 122 having contact surface 124 with shank 130 depending therefrom. Head 122 and shank 130 are formed as a solid component. As illustrated in FIG. 10, the fully assembled fastener 110 includes a series of external threads 128 about shank 130. The illustrated head 122 has a hexagon configuration with six engagement faces 123 (only three are shown), however, other configurations may be utilized. For example, but not limited to, head 122 may be square, straight hex head, hex flange, cap screw or have a hexalobular internal driving feature. Fastener body 120 may be made to correspond with any desired standard, for example, metric, SAE, ASTM, or British standard. Furthermore, fastener body 120 may include friction modifiers or the like. Various other modifications may be made to fastener body 120 without departing from the scope of the invention.

Referring to FIG. 8, load indicator 140 in accordance with the present embodiment of the invention is substantially the same as the previous embodiments and includes annular body 141 and a plurality of protuberances 142 integral with annular body 141 struck and partially sheared from annular body 141 to project from first face 144 of annular body 141 and leave a corresponding plurality of indentations 146 in second face 148 of annular body 141 opposite from first face 144. Load indicator 140 has a through hole 145 with protuberances 142 and indentations 146 extending generally concentric thereabout. Through hole 145 has an inside minimum diameter H that is slightly larger than diameter S of outside surface 132 of shank 130. As such, load indicator 140 is positionable about shank outer surface 132, as illustrated in FIG. 9. Load indicator 140 of this exemplary embodiment is distinct from the previous embodiments in that second face 148 of annular body 141 does not include an annular groove, but instead, through hole 145 has the same general diameter through the thickness of annular body 141.

Referring to FIG. 10, in this exemplary embodiment, after load indicator 140 has been positioned about shank 130, free end 134 of shank 130 is rolled to form a plurality of threads 128. The diameter T at the crests of threads 128 is greater than the minimum inside diameter H of the through hole. As such, upper most thread 128a defines a radially extending member which engages second face 148 of annular body 141 to retain load indicator 140 on fastener body 120 such that load indicator 140 and fastener body 120 form an integral unit. Rolling of threads 128 is controlled such that distance I between upper most thread 128a and head contact surface 124 is greater than distance F between load indicator second face 148 and the crest of protuberances 142. Such relationship provides an assembled clearance between load indicator 140 and fastener body 120 such that load indicator 140 is rotatable relative to fastener body 120 while remaining captured on fastener body 120.

Figure 11:
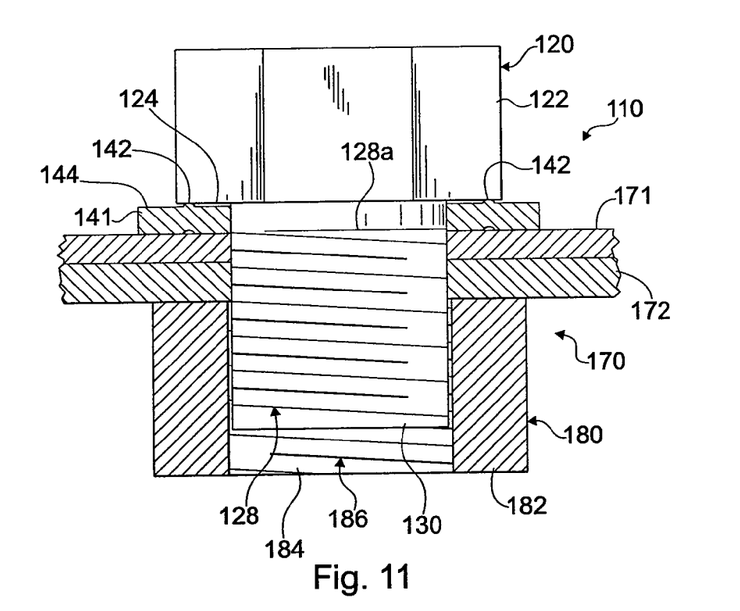
FIG. 11 is a cross-sectional view of a joint assembly in which the load indicating fastener of FIG. 7 has been tightened.

The use of load indicating fastener 110 of FIGS. 7-10 is shown in FIG. 11. An exemplary joint assembly 170, comprising a pair of joint members 171 and 172, load indicating fastener 110, and secondary fastener 180, is assembled with the proper tension by use of load indicating fastener 110. In this exemplary embodiment, secondary fastener includes nut 180 having head 182 defining through bore 184 with a series of internal threads 186. Threaded shank 130 of load indicating fastener 110 is extended through joint members 171 and 172. Threads 128 are engaged with threads 186 within secondary fastener 180. Since load indicator 140 is integral with fastener body 120, it can not be inadvertently omitted.

As secondary fastener 180 and fastener body 120 are threadably engaged with one another, protuberances 142 contact fastener body contact surface 124 and surface 124 begins bearing against the tops of protuberances 142. As tightening continues, load indicator 140 is subjected to the clamping load between secondary fastener 180 and fastener body 120 as the joint is assembled and tightened either by driving secondary fastener 180 or fastener body head 122. As the tightening proceeds, protuberances 142 of load indicator 140 collapse back into their associated indentations 146 and the gap between top surface 144 of load indicator 140 and contact surface 124 of fastener body 120 is reduced. Since second face 148 of load indicator 140 moves away from threads 128 during tightening, as illustrated in FIG. 11, there is no risk of load indicator 140 interfering with tightening. When the gap has been reduced a prescribed amount, as measured by a "feeler" gage, the tightening is stopped because the gap represents proper tensioning. The intended gap can have any desired height, including a zero height. In such case, a zero clearance between top surface 144 of load indicator 140 and contact surface 124 (i.e., the two surfaces are in contact with one another) will indicate proper tensioning and a "feeler" gage may not be required.

The intended gap represents proper tensioning because load indicator 140 and fastener body 120 are matched to one another such that protuberances 142 will plastically deform into annular body 141 when the compressive force applied to load indicator 140 has reached the desired tension. The selected load indicator 140 will have characteristics, for example, the number, size and configuration of protuberances 142, the material and hardness of annular body 141 and the like, which, when tensioned by a fastener body 120 having selected characteristics, for example, size, material, contact surface hardness, thread pitch, thread type, and the like, will plastically deform and achieve the desired gap at an intended tension.

Since a matched load indicator 140 is captured on fastener body 120, the risk of an end user mismatching a load indicator with a fastener body, which may result in a false indication of tension, is eliminated. Furthermore, since load indicator 140 is captured on fastener body 120, the risk of an end user improperly orienting load indicator 140 with respect to fastener body 120, for example, with protuberances 142 facing away from contact surface 124, is eliminated. As such, the compressive interface between protuberances 142 and contact surface 124 is assured and the gap "g" is consistently defined between top surface 144 of load indicator 140 and contact surface 124. Such results in greater consistency of assembly, i.e. load indicators 140 are not inadvertently omitted, misoriented, or duplicated, and consistency of load indication.

While preferred embodiments of the invention have been shown and 10 described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A load indicating fastener comprising:
a load indicator comprising:
an annular body defining a through hole having a minimum diameter and a retainment shoulder; and
a plurality of protuberances having crests and being integral with said annular body struck and partially sheared from said annular body to project from a first face of said annular body and leave a corresponding plurality of indentations in a second face of said annular body opposite from said first face; and
a fastener body comprising:
a series of threads;
a head defining a contact surface; and
a shank depending from said contact surface, said shank including:
a first portion having a first outside diameter less than said through hole minimum diameter such that said load indicator is received on said shank first portion with said protuberances proximate to and in alignment with said head contact surface; and
a second portion including at least one radially extending member having a top surface and a second outside diameter greater than said through hole minimum diameter such that said load indicator is retained on said fastener body with the top surface adapted to engage the retainment shoulder, the distance between the top surface and the contact surface of the head being greater than the distance between the retainment shoulder and the crest of the protuberances so that a controlled gap exists between the top surface and the retainment shoulder before collapse of the protuberances.

2. The load indicating fastener according to claim 1 wherein each of said protuberances is curved in outline and defined by:
(a) a pair of outer side walls extending away from said first face of said annular body, and
(b) an outer surface extending between said pair of outer side walls and between two spaced regions of said first face of said annular body, and
each of said indentations is curved in outline and defined by:
(a) a pair of inner side walls extending through said annular body from said second face of said annular body and from which a pair of outer side walls of one of said protuberances has been sheared, and
(b) an inner surface extending between said pair of inner side walls and between two spaced regions of said second face of said annular body.

3. The load indicating fastener according to claim 1 wherein said radially outermost points of said protuberances lie on a circle that is within a periphery defined by said head contact surface.

4. The load indicating fastener according to claim 1 wherein said fastener body defines a through bore extending through said head and said shank and said series of threads are provided along an inside surface of said through bore.

5. The load indicating fastener according to claim 4 wherein a free end of said shank is deformed radially outwardly to constitute said at least one radially extending member.

6. The load indicating fastener according to claim 5 wherein said shank free end includes a plurality of spaced apart tabs.

7. The load indicating fastener according to claim 5 wherein an annular groove having a diameter greater than said second outside diameter is defined in said annular body second face about said through hole to define said retainment shoulder within said annular body.

8. The load indicating fastener according to claim 7 wherein said shank free end and said annular groove are configured such that said shank free end is retained within said annular groove as said fastener is tightened.

9. The load indicating fastener according to claim 7 wherein in an assembled condition, said at least one radially extending member is completely retained within said annular groove.

10. The load indicating fastener according to claim 7 wherein said annular groove has a depth about half of a thickness of said annular body.

11. The load indicating fastener according to claim 1 wherein said series of threads are provided along an outside surface of said shank second portion.

12. The load indicating fastener according to claim 11 wherein said threads have a crest diameter greater than said minimum diameter of said through hole such that an end thread of said series of threads engages said annular body second face and defines said radially extending member.

13. The load indicating fastener according to claim 1 wherein said load indicator and said fastener body each have selected characteristics such that a desired gap is achieved between said annular body first face and said fastener body contact surface upon application of a desired tension on said load indicating fastener.

14. The load indicating fastener according to claim 13 wherein said selected characteristics of said load indicator include one or more of a number of said protuberances, a size of said protuberances, a configuration of said protuberances, a material of said annular body and a hardness of said annular body.

15. The load indicating fastener according to claim 13 wherein said selected characteristics of said load indicator include one or more of a size of said fastener body, a material of said fastener body, a hardness of said contact surface, a thread pitch and a thread type.

16. A load indicator adapted to engage a fastener body having a contact surface, a shank with an outside diameter, and a radially extending member with a top surface and a bottom surface, the load indicator comprising:
an annular body having a thickness and defining a through hole with a minimum diameter larger than the outside diameter of the shank; and
a plurality of protuberances having crests and an uncompressed height and being integral with and formed from said annular body to project from a first face of said annular body and leave a corresponding plurality of indentations in a second face of said annular body opposite from said first face, the second face including an annular groove having an inside diameter greater than the through hole minimum diameter, extending partially through the thickness of the annular body, and defining a retainment shoulder,
such that when the load indicator is retained on the fastener body with the top surface engaging the retainment shoulder, (a) the distance between the top surface and the contact surface is greater than the distance between the retainment shoulder and the crests of the protuberances and (b) the distance between the bottom surface of the radially extending member and the second face is greater than the uncompressed height when the protuberances are in non-compressive contact with the contact surface.

17. A joint assembly comprising:
a least one joint member;
a load indicating fastener comprising:
  a load indicator comprising:
    an annular body defining a through hole having a minimum diameter and a retainment shoulder; and
    a plurality of protuberances having crests and being integral with said annular body struck and partially sheared from said annular body to project from a first face of said annular body and leave a corresponding plurality of indentations in a second face of said annular body opposite from said first face; and
  a fastener body comprising:
    a first series of threads;
    a first head defining a contact surface; and
    a first shank depending from said contact surface, said first shank including:
      a first portion having a first outside diameter less than said through hole minimum diameter such that said load indicator is received on said shank first portion with said protuberances proximate to and in alignment with said head contact surface; and
      a second portion including at least one radially extending member having a top surface and a second outside diameter greater than said through hole minimum diameter such that said load indicator is retained on said fastener body with the top surface adapted to engage the retainment shoulder, the distance between the top surface and the contact surface of the head being greater than the distance between the retainment shoulder and the crests of the protuberances so that a controlled gap exists between the top surface and the retainment shoulder before collapse of the protuberances;
  a secondary fastener comprising:
    a second fastener body; and
    a second series of threads;
  wherein said first shank or a portion of said second fastener body is extended through said at least one joint member and said first series of threads is threadably engaged with said second series of threads until said first head contact surface is spaced a given distance from said annular body first face.

18. A load indicating fastener comprising:
a fastener body having a contact surface and a radially extending member with a bottom surface; and
a load indicator having an annular body positioned about and captured by a portion of the fastener body, the load indicator further having a plurality of protuberances integral with said annular body struck and partially sheared from said annular body to project from a first face of said annular body and leave a corresponding plurality of indentations in a second face of said annular body opposite from said first face, the protuberances having an uncompressed height such that the distance between the bottom surface of the radially extending member and the second face is greater than the height when the protuberances are in non-compressive contact with the contact surface.

19. A method of producing a load indicating fastener comprising:
providing a fastener body comprising a first series of threads, a head defining a contact surface, and a shank depending from said contact surface;
providing a load indicator comprising (a) an annular body defining a through hole having a minimum diameter and a retainment shoulder, and (b) a plurality of protuberances having crests and being integral with and formed from the annular body to project from a first face of the annular body and leave a corresponding plurality of indentations in a second face of the annular body opposite from the first face;
positioning the load indicator about said shank such that said protuberances are proximate to and in alignment with said head contact surface; and
defining at least one radially extending member having a top surface and an outside diameter greater than said through hole minimum diameter about said shank such that said load indicator is retained on said fastener body with the top surface adapted to engage the retainment shoulder, the distance between the top surface and the contact surface of the head being greater than the distance between the retainment shoulder and the crest of the protuberances so that a controlled gap exists between the top surface and the retainment shoulder before collapse of the protuberances.

20. The method according to claim 19 wherein said fastener body defines a through bore extending through said head and said shank and said series of threads are provided along an inside surface of said through bore.

21. The method according to claim 20 further comprising the step of forming an annular groove having a diameter greater than said second outside diameter in said annular body second face about said through hole to define the retainment shoulder within said annular body.

22. The method according to claim 21 wherein the step of defining at least one radially extending member includes deforming a free end of said shank radially outwardly such that said radially outwardly deformed free end is received in said annular groove.

23. The method according to claim 19 wherein the step of defining at least one radially extending member includes forming said series of threads along an outer surface of said shank.

* * * * *

UNITED STATES PATENT AND TRADEMARK OFFICE
CERTIFICATE OF CORRECTION

PATENT NO. : 7,635,243 B2  
APPLICATION NO. : 11/501993  
DATED : December 22, 2009  
INVENTOR(S) : Turner et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this

Twenty-first Day of December, 2010

David J. Kappos
*Director of the United States Patent and Trademark Office*